United States Patent Office 3,505,073
Patented Apr. 7, 1970

3,505,073
FEED COMPOSITION AND METHOD OF
PREPARING SAME
Harold Eli Bode, 14170 Onaway Road,
Cleveland, Ohio 44120
No Drawing. Continuation-in-part of application Ser. No.
215,498, Aug. 8, 1962. This application Mar. 1, 1965,
Ser. No. 437,010
Int. Cl. A23k 1/02
U.S. Cl. 99—9                                      8 Claims

ABSTRACT OF THE DISCLOSURE

A dry, non-hygroscopic molasses product is obtained by fermenting the hygroscopic sugars in molasses to lactic acid, lime neutralizing, and drying the resulting lime-neutralized lactated molasses. By blending a lime-neutralized lactated molasses with diammonium phosphate, an aqueous suspension of such a blend results in a mixture of an ammonium lactate solution and a dicalcium phosphate. Ammonium lactate has unusually high synthetic protein availability for ruminants, and dicalium phosphate is an excellent animal feed nutritional source for calcium and phosphorus.

---

This application is a continuation-in-part of my abandoned application Ser. No. 215,498 filed Aug. 8, 1962. The latter is a continuation of my abandoned application Ser. No. 172,638, filed Feb. 3, 1958. The latter is a continuation of my abandoned application Ser. No. 321,269 filed Nov. 18, 1952.

This invention relates to new carbohydrate feed products, feed supplements, and methods for producing the said products. More particularly, this invention is concerned with a method of modifying the animal feed nutritional property of feed carbohydrates and of industrial by-product carbohydrate waste liquors which contain lactic acid fermentable carbohydrates as the principal ingredients, and which are directly utilizable in animal feeds.

One object of this invention is the production of a feed product whose carbohydrate content has been fermentatively converted to lactic acid, and whose resulting in situ lactic acid is, in turn, converted to an animal nutritional lactate, such as calcium, ammonium, or urea lactate.

Another object of this invention is to exploit diammonium phosphate as a means for simultaneously transforming calcium lactate created by the above said in situ procedure to ammonium lactate and dicalcium phosphate.

Another object of the invention is to produce a non-hygroscopic feed-molasses by converting the fermentable sugars in molasses to lactic acid and thereafter transforming the said lactic acid to a non-hygroscopic lactate such as calcium lactate.

Another object of the invention is to exploit low cost viable lactic acid microorganism sources such as steeped corn products or farm silage juice as a means for converting carbohydrate liquors to lactic acid.

Still another object of the invention is to ammoniate the calcium salts of acidic animal feed materials such as lactic acid, acetic acid, butyric acid, propionic acid, sugar acids, soluble proteins or polypeptides, amino acids, or phytic acid, by means of diammonium phosphate; and thereby simultaneously produce valuable biologically efficient synthetic protein materials as well as dicalcium phosphate, a valuable animal feed constituent from the standpoint of fulfilling nutritional calcium and phosphorus requirements.

Still another object of the invention is to transform hygroscopic carbohydrates, particularly sugars, to a non-hygroscopic calcium lactate form in order that by-product or waste carbohydrate liquors can be dried to a substantially non-hygroscopic state and blended in any proportion with other dry animal feed products.

Another object of the invention is to use dry diammonium phosphate as a blending reagent with dry feed products containing calcium lactate; thereby creating a tool for forming efficient biologically available synthetic protein through ammonium lactate.

The present invention, in one of its principal aspects, relates to a method of modifying the nutritional properties of an industrial fermentable crude carbohydrate or a carbohydrate waste liquor of the kind which is directly utilizable as an animal feed ingredient. Among the materials which can be pertinently processed by my method are corn or other carbohydrate grains, corn steepwater, cane or beet molasses, whey, wood-sugar or citrus molasses, distillers' slop, and various other carbohydrate by-product or waste liquors available in such industries as cane or beet sugar manufacture, beer or alcohol production, and waste products from the processing of vegetables or fruits. Mixtures of these various liquors can also be used. Preferably the fermentation is continued until at least one-half of the carbohydrate in the liquor has been converted to lactic acid.

The preferred degree of lactic acid fermentation will depend upon the plant facilities, and particularly the economy, of the location wherein such a fermentation is taking place. From the standpoint of maximum synthetic protein creation, the ideal condition will be that wherein more than 95 percent of the fermentable carbohydrate, and preferably more than 98 percent, has been converted to lactic acid. Where the carbohydrates in the crude liquor consist primarily of free sugars such as dextrose, maltose, lactose, levulose, or sucrose, the completion of the fermentation carbohydrate conversion to lactic acid can be done in a shorter time than would be the case with carbohydrate polymers such as dextrins or starch. The greater the conversion of free sugars in lactic acid, the greater will be the amount of ammonia or urea that can be chemically reacted with the lactic acid. This, in turn, will mean a correspondingly larger creation of synthetic protein.

Under certain conditions, particularly in the case of corn steepwater, large amounts of free lactic acid can be produced with the help of the in situ corn lactic acid microorganisms, without it being necessary to resort to partial lime neutralization for the efficient continuation of the lactic acid fermentation. In such a situation, ammonia can be added directly to the resulting crude lactic acid steepwater liquor. The resulting ammonium lactate is a very efficient synthetic protein because of its considerably higher biological availability as compared to ammonia in the form of ammoniated molasses or beet pulp products, or as compared to urea.

Corn steepwater is a commercial commodity produced by the wet corn milling industry and used in large amounts in the manufacture of penicillin and other antibiotics. During the wet corn milling process, the dry corn kernel is first subjected to a steeping process in order to properly soften and condition the corn kernel before the latter is subjected to milling. The corn is steeped for about 48 hours in a weak sulfur dioxide water solution. During this steeping period, the weak sulfurous acid solution extracts about 3.2 pounds of solubles dry substance from each bushel of treated corn. This dilute solution of corn solubles and sulfurous acid is what is known as light corn steepwater. This steepwater contains lactic acid bacteria capable of efficiently converting sugars to lactic acid. Incubated steepwater will usually contain between 10 percent and 20 percent of lactic acid. This acid is formed by the action of the steepwater lactic acid bacteria on the dextrose and other fermentable carbohydrates present in steepwater.

Steepwater lactic acid bacteria and other lactic acid forming organisms emanate from the corn kernel. They are able to efficiently convert fermentable carbohydrate to lactic acid if allowed to act at between 120 to 130 degrees Fahrenheit for a period of between about 40 and 125 hours. One of the reasons why steepwater lactic acid bacteria are efficient lactic acid producers is the presence of an ideal combination of soluble protein and phosphate in the steepwater.

Steepwater dry substance in corn steepwater obtained in a wet corn milling plant will contain between about 5 and 25 percent of dextrose, depending upon the particular plant steeping conditions. The variation in dextrose content is due to the variation in the degree of lactic acid fermentation of the dextrose which takes place during the steeping process and during the time it takes to process the light steepwater into heavy steepwater. In addition to dextrose and lactic acid, steepwater dry substance consists of about 40 to 50 percent protein, 10 to 20 percent of free amino acids, 7 percent of phytic acid and about 20 percent of ash. The ash consists of valuable nutritional and microorganism nutrient material. Steepwater ash consists of about 37 percent $P_2O_5$, 36 percent $K_2O$, 15 percent MgO and small amounts of the oxides of sodium, calcium and iron.

Hitherto it has not been possible to take practical advantage of the excellent synthetic protein availability of ammonium lactate. This is because, in the past, commercial amounts of lactic acid have only been produced under ideal lactic acid microorganism fermentation conditions. This involves expensive procedures for isolating and commercially producing pure lactic acid microorganisms, as well as expensive procedures for isolating or removing crude calcium lactate from dilute liquors and subsequently redissolving and refining liberated lactic acid. With such complex procedures, the cost of lactic acid becomes too excessive for any kind of animal feed ammonia.

I have found that a practical animal feed ammonium lactate can be created by exploiting the lactic acid microorganisms which are present within every kernal of corn, other grain, or silage. I have also found, that for feed economy conditions, it is not necessary to resort to any expensive purification or fractionation of these agricultural lactic acid microorganisms. Neither is it necessary to resort to the addition of expensive nutrients for lactic acid microorganisms such as phosphates or nitrogen compounds.

In accordance with this invention, an ideal low cost lactic acid fermentation starter can be obtained from steeped corn. This can be either corn steepwater resulting from the solubles extracted from corn kernels during soaking with dilute sulfur dioxide solution, or such a starter can also be obtained by soaking either whole ground corn or corn germ in either water or water to which some sulfur dioxide has been added. By allowing such a steeped or soaked comminuted corn or corn fraction material to stand at lactic acid creating fermentation temperatures, such as a temperature of between 120 degrees and 130 degrees Fahrenheit, the in situ corn lactic acid microorganisms can be exploited as a lactic acid fermentation starter for other dilute fermentable carbohydrate solutions, particularly dilute solutions containing free fermentable sugars.

For the most efficient lactic acid creating conditions, dextrose is the most ideal sugar substrate.

Dextrose polymers, particularly starches or dextrine are fermented at a much slower rate of lactic acid microorganisms. Because of this, when it is desired to create lactic acid from the starch in amylaceous material such as corn, other grains, or various flour-milling fractions, I prefer to resort to an efficient enzymatic conversion of a part or all of the starch in the grain to dextrose; thereby creating a very efficient substrate for the in situ grain lactic acid microorganisms.

I have found that conditions can be created whereby a simultaneous fermenting conversion involving the simultaneous creation of dextrose and lactic acid can be obtained. One can also create conditions where some of the simultaneously produced lactic acid is converted to either calcium lactate or ammonium lactate.

I have found that, for the purpose of an efficient animal feed economy, diammonium phosphate can serve as a unique reagent tool in conjunction with the production of cheap animal feed grade calcium lactate. By adding feed grade diammonium phosphate to crude liquors containing calcium lactate, I am able to simultaneously produce the highly efficient synthetic protein base of ammonium lactate in parallel with the nutritionally valuable dicalcium phosphate.

Since the commercial price of diammonium phosphate, ammonia, and dicalcium phosphate are about the same, usually between $80.00 and $120.00 a ton, the production of dicalcium phosphate from diammonium phosphate via calcium lactate actually creates a situation where the only reagent cost of the synthetic protein base, namely the ammonia in the ammonia lactate, is the cost of the lime required to neutralize the fermentatively produced lactic acid.

Dicalcium phosphate is a valuable animal feed material for both ruminants as well as non-ruminants, particularly poultry. It has been found, that due to its much greater specific gravity than ammonium lactate, the dicalcium phosphate which precipitates upon the addition of diammonium phosphate to a crude feed grade calcium lactate liquor can be allowed to readily settle and separate from the remaining ammonium lactate liquor. The settled dicalcium phosphate can either be used directly by ruminants or, after washing or filtering to remove residual ammonium salts, can be used as a poultry feed.

While diammonium phosphate is the preferred reagent for use in conjunction with calcium lactate as a means for producing ammonium lactate, my invention is not limited to this particular compound. Nor is calcium lactate the only metal lactate that can be used as a vehicle for reacting with an ammonium salt to produce ammonium lactate solution and a simultaneous insoluble precipitate of a metal salt. The preferred procedure in this invention is one wherein an ammonium compound is added to a crude lime-neutralized lactate carbohydrate for a simultaneous production of crude ammonium lactate and an edible insoluble precipitate of a calcium salt. However, one may also use lactic acid neutralizing agents which do not produce animal feed edible metal lactate but which, upon reaction with an ammonium salt resin in the production of an ammonium lactate liquor and an insoluble metal salt which can be completely removed from the said liquor.

For example: ammonium carbonate or ammonium bicarbonate can be used in place of diammonium phosphate. These compounds, when reacted with crude lime-neutralized lactated carbohydrates, produce ammonium lactate and a precipitate of calcium carbonate. The latter is a nutritional source for calcium for poultry feeds; and may be used as such when properly separated from the crude ammonium lactate liquor. Similarly, ammonium sulfate may be used to produce ammonium lactate and an insoluble precipitate of calcium sulfate. The latter compound is of some value as a calcium source for ruminants.

In using the above types of compounds instead of ammonium phosphates, the advantages of a balanced nutritional ratio of calcium and phosphorous in the animal feed is lowest. This can be compensated for by a supplemental addition of feed grade diammonium phosphate or phosphoric acid.

An example of the use of a neutralizing agent for lactated crude carbohydrates which produces inedible insoluble precipitates, is the use of barium hydroxide or barium carbonate to produce the barium lactate. Upon the addition of an ammonium salt such as ammonium carbonate or ammonium sulfate, there results a corresponding precipitate of barium carbonate or barium sulfate. The latter compound in particular is highly insoluble and can be removed with a sufficient degree of thoroughness to allow the remaining crude ammonium lactate liquor to be usable as an animal feed product.

Lactic acid is by far the most efficient edible acid vehicle for acting as a means for introducing ammonium lactate via metal salt of lactic acid. However, there are manufacturing plant as well as farm locations areas wherein lactic acid may not be the ideal source from an economic standpoint. In such situations, other edible animal feed acids capable of forming metal salts which, in turn, react with ammonium compounds to produce the ammonium salt of the said edible acid and an insoluble precipitate of the corresponding metal salt will conform with the principles of this invention. Examples of such animal feed edible acids derived from carbohydrates are acetic, butyric, propionic, and various sugar acids such as gluconic or saccharonic acids. These acids can be created by either fermentative means or by chemical means such as oxidation with hydrogen peroxide. Examples of fermentations resulting in products containing the above types of acids are vinegar manufacture, sauerkraut liquors, and the enzymatic conversion of dextrose to gluconic acid by means of gluconoxidase.

Examples of chemical means for creating the above types of acids are the chemical oxidation of dextrose to gluconic acid.

The same principles will apply to soluble metal salts of animal feed nitrogenous material such as the calcium salts of polypeptides or various amino acids, and complex phytic acid compounds. For example, the addition of diammonium phosphate to a crude animal feed liquor containing dissolved calcium salts of soluble proteins or various amino acids, results in the production of a solution comprising soluble ammonium salts of polypeptides and amino acids, together with a precipitate of dicalcium phosphate.

Since this invention is primarily concerned with the transformation of crude, feed-grade carbohydrate material to lactic acid, followed by subsequent neutralization of the said lactic acid with an edible animal feed material, I desire to use the term "lactated carbohydrate" in this specification and to define this as carbohydrate liquor wherein a major portion of the carbohydrate content, particularly the free sugars, have been fermentatively converted to lactic acid. In accordance with this definition, a lactated corn steepwater is one wherein a major portion of its fermentable sugars has been converted to lactic acid. Similarly, a lactated molasses is a molasses liquor wherein most or all of its sugars have been converted to lactic acid. Correspondingly, similar terminology will apply to lactated liquors such as whey, distillers' slop, and waste or by-product liquors from the processing of such materials as sugar cane, sugar beets, various fruits or vegetables, meat packing house liquors, and by-product or waste liquors from factories or production of alcoholic beverages. For animal feed materials possessing in situ created or added sugars and subjected to lactic acid fermentations I desire to use the term "lactated sugarized" feed product.

Blackstrap molasses from cane sugar refineries, beet molasses, and corn sugar molasses known as hydrol have long been known to be very hygroscopic. Because of this, all past efforts to produce a non-hygroscopic dried molasses have met with failure.

I have discovered a means for treating molasses whereby the sugar ingredients are transformed to a non-hygroscopic form. In practicing this phase of my invention, I subject molasses to the action of either steepwater or silage juice containing active lactic acid microorganisms. These bacteria, together with the excellent nutrient materials of the steepwater, serve as a means for efficiently and cheaply transforming the fermentable sugars in molasses to lactic acid. By neutralizing this lactic acid with lime, there is obtained calcium lactate. The latter, in contrast to the original sugars in the molasses, is non-hygroscopic. When a molasses which has had its sugars converted to calcium lactate is dried, a dehydrated molasses product is obtained which is much less hygroscopic than non-treated dehydrated molasses.

The treated dehydrated molasses consists of all of the non-sugar molasses, plus the additional nutritional value of the calcium coming from the calcium lactate, as well as the calcium combined with the acidic non-sugar ingredients of molasses. Calcium is a valuable constituent in animal feed nutrition, and many cereals, particularly corn, are deficient in calcium content. The use of my new modified molasses by feed mixers enables them to utilize a product which simultaneously possesses molasses and calcium nutritional advantages.

My new type of dry, non-hygroscopic, lime-neutralized lactated molasses is also valuable as a means for making possible dry blends of animal feed fat and molasses. With regular molasses, its viscosity and stickiness precludes blending with large proportions of feed fat.

With lime-neutralized, dry, lactated molasses, any amount of fat can be blended in, without having viscosity or stickiness problems. Such blends are valuable for ruminants as well as poultry.

For ruminants, the above type of blends of lactated molasses and feed fat is of particular value when further blended with diammonium phosphate to create a cheap source for ammonium lactate; thereby creating a blended source of synthetic feed protein, non-sugar molasses solids, lime, phosphate, and feed fat.

Lactic acid microorganisms also exist in other grains, as well as the silage of various agricultural plants. This too can serve as a cheap source for a lactic acid incubation starter for molasses or other feed materials containing carbohydrates, particularly free sugars. For example, a few cubic centimeters of silage juice obtained from green forage stored in a silo contain active lactic acid microorganisms and can be used to ferment animal feed carbohydrates, particularly sugars, to lactic acid. The optimum fermenting temperature to be used will depend upon the particular group of lactic acid microorganisms being employed.

For the production of a molasses of greatly increased available protein content, I treat the lactic acid created in situ by a steepwater or silage juice conversion of molasses, with ammonia. This readily converts the lactic acid to ammonium lactate. Ruminants can readily utilize the ammonia in ammonium lactate as a source for protein. Poultry and other animals can also utilize ammonium lactate in limited amounts. By converting the fermentable sugars in molasses to ammonium lactate, I am able to produce a molasses liquor containing as much as 10 percent of chemically combined ammonia which is equivalent to 46.8 percent of synthetic protein based upon the total treated molasses dry substance.

Since ammonium lactate is hygroscopic, it is not practical to produce a dehydrated molasses containing ammonium lactate. Since the sweetness of the sugars in molasses are a factor in animal palatability, I prefer to produce a lactic acid converted molasses wherein only a part of the sugars are transformed into ammonium lactate. A preferred product which combines the sythetic protein advantages of ammonium lactate with the sugar palatability advantage is a product wherein about 75 percent of the fermentable sugars have been converted to ammonium lactate. Where the valuable calcium constituent is also desired, one may produce a molasses comprising ammonium lactate, calcium lactate, and some free sugar.

In ordinary wet corn milling processing it has frequently been a problem of finding sufficient protein in the millhouse to be able to have the necessary minimum of 23 percent protein in gluten feed and 42 percent protein in gluten meal. Ordinary steepwater dry substance contains about 45 percent protein. This protein is an important contributor to building up to the 23 percent protein content in the manufacture of corn gluten feed. When conditions are such that insufficient protein is available from the millhouse by-products to give the desired protein balance in gluten feed and gluten meal, the use of my ammoniated steepwater serves as a simple and efficient means of stepping up the available protein content of these feed products. Urea may be used in place of ammonia to neutralize the lactic acid in the steepwater.

Hydrol or molasses from other sources cannot be readily admixed into the cereal feeds because of their high viscosity and stickiness. At present, it takes special costly mechanical equipment to attain a uniform mixture of a dry feed material with molasses. After the molasses has been, with the aforesaid difficulties, incorporated into the feed product, the amount of molasses which one may add is very limited because of the hygroscopic nature of the molasses.

By adding molasses to steepwater and by converting the hygroscopic sugars in the molasses to the non-hygroscopic calcium lactate, I create a condition wherein the said converted molasses in the steepwater can be added to gluten feed, gluten meal, or to any other cereal feed, in a simple manner without being concerned about the hygroscopic problem. In the case of a wet corn milling plant where most of the steepwater is added to the gluten feed channel, the addition of hydrol to steepwater offers a simple and cheap way of incorporating the hydrol in a non-hygroscopic form into the feed product.

My process also offers a means of producing an ammoniated steepwater capable of being concentrated to a higher dry substance content than the concentrated liquor corn steepwater of commerce. Steepwater sold to the penicillin trade or to other commercial consumers consists of light steepwater which has been vacuum concentrated to a dry substance content of between 53 and 55 percent. It is not possible to concentrate such steepwater beyond about 55 Brix and still obtain a homogeneous liquor material which is readily pumpable. By neutralizing the lactic acid in light steepwater with ammonia, filtering off the resulting precipitate consisting primarily of ammonium phytates, and vacuum concentrating the resulting filtrate at high vacuum, I am able to produce a concentrated liquor of high ammonium lactate content and of a total dry substance content of between 70 and 80 percent. Such a highly concentrated ammoniated steepwater is distinctly advantageous from the standpoint of savings in water freight costs during the shipment of such liquor material and from the standpoint of making available a material high in thoroughly dispersed natural protein as well as high amounts of synthetic protein from the ammonium lactate.

For this kind of product, I prefer adding cane blackstrap molasses to the light steepwater and to convert the molasses sugars to a mixture of ammonium lactate and free sugar. When the ammonia is added and the ammonium phytate removed in this type of procedure, I obtain a product which, when concentrated to about 75 Brix, consists of an ideal combination of all the nutritional attributes of the original blackstrap molasses plus the synthetic protein from the ammonium lactate plus the excellent nutritional protein of the steepwater solubles. In place of ammonia, urea may be used to precipitate the phytin and produce urea lactate.

The above type of product is also valuable as a means for blending with ordinary molasses to produce various mixtures of ammoniated molasses containing various amounts of synthetic protein.

In producing an ammoniated corn steepwater, the ammonia reacts not only with the lactic acid but with the the amino acids and acidic soluble protein materials. Soluble ammonium salts of these amino acids and peptides are formed as well as ammonium phytate. There is thus produced valuable organic ammonium compounds which are in a nutritionally available form for animals. Each pound of ammonia which is thus combined means an equivalent addition of about 5.15 pounds of synthetic protein.

My invention is not limited to molasses materials as a source for carbohydrate conversion to lactic acid by the steepwater lactic acid bacteria. One may add any carbohydrate which is convertible to either dextrose, levulose, maltose, sucrose, lactose, galactose, pentose, or low molecular weight fermentable polysaccharides. In a wet corn milling plant, such cheap carbohydrate material as acid or diastase converted starch from millhouse fine or coarse slop may be used in place of molasses. Converter liquor from the corn syrup or dextrose manufacturing channels of a corn starch sugar refiner are perfectly suitable. Similarly, greens or washwaters from the dextrose plant may be used. Outside of a wet corn milling plant, any amylaceous material may be added to the steepwater for subsequent lactic acid conversion of the said material's starch content. Examples are ground corn, milo sorghum, wheat or oats and various meals such as cornmeal, or hominy feed.

In adding steepwater containing active lactic acid bacteria to molasses or other sugar material for subsequent lactic acid fermentation, proper precautions should be taken that sufficient soluble protein and phosphate nutrients are present to assure an efficient lactic acid microorganism activity.

Where the ratio of sugars to protein in the fermenting batch is greater than 1.0, it is preferable to add more protein. This can be done in several ways. One procedure whach has been found to be satisfactory is to precipitate out the phytates from steepwater with ammonia and add the filtrate to the mixture of molasses with regular steepwater. This filtrate is higher proportionately in protein content and in addition to this the ammonia in the filtrate is organically combined in a form which creates available synthetic protein for the lactic acid microorganisms.

The exact biologic nature of the lactic acid forming agents in corn-steepwater is not known, but it is believed they are primarily bacteria and complex enzymes.

It is not necessary to rely entirely upon the lactic acid microorganisms in corn steepwater or silage juice. Steepwater from milo sorghum may be used. In case the steepwater lacks sufficient lactic acid forming biologic material, the lactic acid activity may be increased by fortifying with steepwater extracted from corn high in lactic acid forming microorganisms.

One may also add other cultures of lactic acid microorganisms to the steepwater, or to molasses, to whey, or to any other feed-edible material containing fermentable carbohydrates. For example, a lactic acid culture obtained by heating milk or skimmed milk at 45 degrees centigrade until the milk is slightly sour, may be added to steepwater, or to molasses, or to whey. To avoid side fermentation reactions, it is best to add a pure culture made by inoculating sterilized milk at 45 degrees centigrade with bacteria from a previous fermentation batch. To prevent side alcoholic or butyric fermentations, it is best to maintain the lactic acid conversion at between 45 and 55 degrees centigrade. It is also best to use steam or other heat sterilization on the molasses or whey. To prevent excessive lactic acid acidity which causes retarded fermentation, it is preferable to add lime or ammonia at a rate which maintains the acidity at about between 0.5 percent and 1.0 percent.

The preferred concentration of the molasses or molasses steepwater mixture or other carbohydrate liquor undergoing lactic acid fermentation is between 5 to 12 percent total dry substance.

The ratio of fermentable sugar to protein in the fermenting batch should be about 10 to 1, with higher protein content being preferred.

Although corn steepwater from a wet corn milling plant containing active corn lactic acid microorganisms is preferred, the invention is not limited to this material. Where a wet corn milling industry is not available, one may produce a steepwater containing the necessary lactic acid bacteria by soaking corn or milo sorghum or any other grain such as wheat, barley or oats in water or in water which has been acidified with an acid such as sulphurous, sulphuric, hydrochloric, acetic, or lactic acids. The amount of solubles obtained in the resulting grain steepwater will depend upon such factors as soaking time, temperature, acid concentration and the ratio of grain to water.

Where grain is not available, one may practice my invention with molasses, whey or wood sugar liquors, by treating same with milk lactic acid culture or with any other agricultural culture of lactic microorganisms such as cabbage, cucumbers or tomatoes. The necessary amounts of ntrient materials for the fermentation should be provided. The subsequent conversion of the resulting lactic acid in the molasses to calcium lactate will produce a dehydrated molasses material similar in non-hygroscopic qualities to that obtained when molasses is converted with corn steepwater lactic acid bacilli as heretofore described. Similarly, the same lactated molasses, when treated with ammonia, will produce an ammoniated lactated molasses having properties corresponding to that of the product obtained from a molasses-steepwater conversion.

The protein in the fermentation batch may be fortified by the addition of soluble protein material obtained by either the acid or enzyme hydrolysis of extraneous protein material, such as soyabean protein, peanut, linseed or cottonseed protein; and corn proteins such as corn gluten, zein or zeanin.

The following examples illustrate the invention:

EXAMPLE 1

Light corn steepwater from a wet corn milling plant having a dry substance content of 5 percent by weight and containing active lactic acid forming microorganisms, was mixed with steam sterilized blackstrap molasses in an amount sufficient to give the total dry substance in the mixture a sugar content of 50 percent. The resulting mixture was diluted with water to 10 Brix and converted for 72 hours at 125 degrees Fahrenheit. A liquor was obtained consisting of 40 percent of lactic acid based upon the dry substance material in the liquor.

Sufficient lime was added during the 72-hour fermentation to maintain the batch at 1.0 acidity calculated as lactic acid and the batch mixed with a 35 r.p.m. agitator. At the end of the fermentation, sufficient lime was added to adjust the batch to 5.0 pH.

The batch was vacuum concentrated to a heavy pasty-material suitable for admixture with other material incorporated in the manufacture of corn gluten feed.

EXAMPLE 2

Corn kernels were placed in a tank and covered with a dilute heat sterilized, 125 degrees Fahrenheit, milk whey liquor which had been acidified with sulfur dioxide to 3.2 pH. The batch was maintained at 125 degrees Fahrenheit for 48 hours. The resulting lactated sugarized steepwater was decanted from the corn kernels.

The dry substance in this steepwater consisted of the usual regular corn steepwater ingredients of a wet corn milling plant plus whey protein and lactose. A major portion of the dextrose and lactose were fermented to lactic acid and ammoniated to 5.2 pH. The precipitated phytin and other insoluble compounds were removed, and the filtrate dehydrated at high vacuum. A concentrated, ammoniated low-phytin steepwater was obtained which, when blended with molasses or other crude sugar liquors, produces a highly nutritious feed-molasses containing soluble corn and milk protein, dextrose, lactose, levulose, sucrose, ammonium lactate, nutritional soluble phosphate, and most of the valuable other nutrient ingredients present in the original sugar juice which forms the base for a sugar molasses.

The precipitate of ammoniated phytin and insolubles was added to the steeped corn and the mixture fed to dairy cattle.

EXAMPLE 3

Light steepwater from the corn steeps of a wet corn milling plant was placed in a concrete tank and the lactic acid microorganisms in the steepwater were allowed to convert the dextrose and other fermentable carbohydrate in the steepwater to lactic acid by allowing the light steepwater liquor to convert for a 48 hour period at 125 degrees Fahrenheit by adding live steam from a steam jet as required. During the conversion, the batch was subjected to aeration by circulating the batch by means of pumping equipment.

The light steepwater was drawn off from the concrete tank, leaving a sediment at the bottom of the tank amounting to about 5 percent of the total light water. The steepwater was vacuum concentrated in a triple effect evaporator to a dry substance content of 54 percent. This concentrated, lactic acid incubated, steepwater contained 20 percent of lactic acid on a dry substance basis, 40 percent of protein, 14 percent of amino acids and no sugar.

The above lactated concentrated steepwater was neutralized with ammonia to 5.0 pH. A heavy precipitate of ammonium phytate and other floculated organic ammonium salts was obtained. The precipitate was decanted and the supernatant ammoniated steepwater liquor was further concentrated in a vacuum pan at a high vacuum pan temperature sufficiently low to minimize ammonia losses.

The resulting 75 Brix ammoniated steepwater had an ammonia content of 7 percent on a dry substance basis. This is equivalent to making available about 36 pounds of synthetic protein for each 100 pounds of non-ammonia solids in the ammoniated steepwater dry substance.

EXAMPLE 4

Twenty-five parts by weight of the 75 Brix ammoniated steepwater prepared in accordance with Example 3 was mixed with 75 parts of beet molasses which had been heated to 110 degrees Fahrenheit. A molasses-ammoniated steepwater blend was obtained. This product had improved feed-molasses qualities over the non-treated molasses because of the enhanced available synthetic protein content and because of the increased content of highly digestible soluble protein present in the ammoniated steepwater.

To further enhance the feed-nitrition value of the composition, synthetic vitamins such as ascorbic acid or pantothenic acid may be added to ammoniated steepwater before or after vacuum concentration. Similarly, natural vitamin or other nutrient fortifying agents such as alcohol distiller's residue, fish extract concentrates, emulsified vitamin oils and penicillin or other antibiotic concentrates or residues may be added before or after the concentration of either the steepwater or the molasses.

EXAMPLE 5

A whey liquor was steam sterilized, cooled to 120 degrees Fahrenheit and inoculated with a lactic acid culture. The mixture was converted for 72 hours at 120 degrees Fahrenheit. During this fermentation, sufficient ammonia increments were added to maintain the acidity of the batch at 0.5 percent, calculated as lactic acid. At the end of the fermentation, sufficient ammonia was added to react with the rest of the free lactic acid.

In place of ammonia, urea could be used in the above example.

EXAMPLE 6

A whey liquor was mixed with commercial blackstrap molasses until the batch was 10 Brix. The resulting mixture was sterilized by boiling or by steam, cooled to 120 degrees Fahrenheit and inoculated with a lactic acid culture. The mixture was fermented for 72 hours at 120 degrees Fahrenheit. During this fermentation sufficient increments of limestone were added to maintain the free acidity of the batch at 0.5 percent, calculated as lactic acid. At the end of the fermentation, sufficient lime was added to adjust the pH of the fermented batch to 6.0. Upon dehydration, a substantially non-hydroscopic dry blend of calcium lactate, and the non-sugar solids of whey and molasses were obtained.

EXAMPLE 7

The dehydrated dry blend of Example 6 was blended with sufficient dry diammonium phosphate to, upon the addition of water, react with calcium lactate and create ammonium lactate solution and dicalcium phosphate precipitate.

EXAMPLE 8

A feed grade wood sugar molasses containing dextrose and other sugars resulting from the acidic hydrolysis of cellulosic and pentosan materials was diluted with water to 10 Brix, steam sterilized, cooled to 120 degrees Fahrenheit and treated in the same manner as the cooled mixture of whey liquor and blackstrap molasses described in Example 6.

EXAMPLE 9

A feed grade wood sugar molasses was blended with an equal weight of commercial beet sugar molasses, diluted with water to 10 Brix, heat sterilized, cooled to 120 degrees Fahrenheit and treated in the same manner as the cooled molasses and sugar liquor described in Example 8.

EXAMPLE 10

A mixture of equal parts by weight of blackstrap molasses and wood sugar molasses was diluted with water to 10 Brix, heat sterilized, cooled to 115 degrees Fahrenheit and inoculated with a lactic acid culture. The liquor was fermented at 115 degrees Fahrenheit with continuous incremental additions of lime to maintain the batch at 1.0 acidity, calculated as lactic acid. The fermentation was continued until over 95 percent of the sugars present had been converted to calcium lactate. At the end of the fermentation, sufficient lime was added to adjust the batch to 6.0 pH.

The resulting lime-neutralized batch of lactated molasses liquor was vacuum concentrated to a point where the partially dehydrated batch could be conveniently transferred to drying equipment, and subsequently dried, ground, and bagged. The finished dry product having a moisture content of less than 10 percent, was substantially non-hygroscopic, and could be blended in any proportion with other dry feed products.

In place of a mixture of wood sugar and blackstrap molasses, the process described in the above examples, could be applied to a single molasses raw material or to any mixture containing lactic acid convertible sugars, such as whey alone, sucrose molasses products, wood sugar products or amylaceous materials converted to liquors containing fermentable sugars or lower polysaccharides.

Procedure may be widely varied and still remain within the basic concepts of the invention. In place of blackstrap cane molasses, one may use beet molasses, citrus molasses, wood sugar liquors, invert molasses, sugar cane juice, sugar beet juice, sorghum syrup, maple syrup, and acid or enzyme converted amylaceous material from any source.

For economic reasons, it is preferable to use a feed-edible dilute industrial processing liquor as the water for diluting the carbohydrate to a lactic acid fermentable Brix, of about 5 to 15 Brix. In doing this, an economic advantage is obtained because, in most cases, such dilute processing liquors are dehydrated in vacuum pans, and the dehydrated material disposed of in some form of animal feed product. Examples of such commercial dilute feed-edible liquors are dilute corn steepwater, sugar refinery wash liquors, cane juice, sugar beet juice, waste wash liquors from antibiotics production; dilute residues from alcoholic fermentations, such as distillery slops or worts, and meat packing house wash liquors which end up as a vacuum pan-concentrated liquid feed product known as Stick.

Dilute pineapple sugar liquor obtained by the extraction or pressing of pineapple rind material may also be used as the diluent for molasses, or used alone. Any kind of pressed or extracted fruit or vegetable liquors may be subjected to the same procedure to obtain lactated products.

With some feed edible dilute processing liquors, suitable means must be applied to prevent putrefaction during the lactic acid fermentation. Thus, in the case of dilute corn steepwater, sufficient sulfur dioxide is present to prevent putrefaction during the lactic acid fermentation. Sulfur dioxide or other materials capable of inhibiting putrefaction without retarding lactitc acid fermentation, may be used with the above said dilute feed-edible liquors. The particular kind of preferred putrefaction retardant will depend upon the nature of the dilute liquor solubles and upon the particular strain of lactic acid culture which is used.

In place of a lactic acid conversion, one may resort to any carbohydrate conversion resulting in the creation of an in situ acidic material from the carbohydrate. or example, the sugars in molasses or in other carbohydrate sources may be converted by microbiological, electrochemical, or by chemical means into either sugar-acids such as gluconic or glucuronic acids, into acetic acid or into any other acid which is suitable for animal feed. The calcium salts of these acids, or other metal salts of these acids, should be edible from a feed standpoint and should be substantailly non-hygroscopic to conform with the principles of this invention. Ammonium salts of these same acids should have similar feed edibility. As a specific example, molasses or hydrol subjected to an enzymatic conversion of the molasses-sugars to gluconic acid will, when converted to calcium gluconate, produce a treated molasses having similar dried molasses properties to that described in the calcium lactate conversion in Example 1. Similarly, a molasses converted to an ammonium gluconate content has properties similar to an ammoniated molasses of ammonium lactate content. The same principles apply to steepwater in the absence of any added molasses. Such steepwater can have its dextrose content converted to gluconic acid by either enzymatic or chemical means. The resulting steepwater containing both lactic and gluconic acid, can be subjected to either the lime treatment described in Example 1, or to the ammonia treatment described in Example 5.

The calcium phytate precipitate obtained during the treatment of steepwater with lime can be removed to be used for phytin and inositol production. The remaining filtrate comprising soluble calcium compounds of either steepwater or molasses origin can be treated with sulphuric acid, carbon dioxide or phosphoric acid to remove the calcium and the resulting calcium-free filtrate neutralized with ammonia.

For most feed purposes an ammoniated steepwater or steepwater-molasses liquor of about 5.0 pH is preferred to avoid undue darkening of the product. However, the finished lactated products in either ammonium or calcium salt form may be adjusted, if desired, to a pH of between 3.5 and 9.0.

Steepwater varies considerably in phytin-precipitating characteristics. To prevent further phytin or other insolubles flocculation in a finished ammoniated steepwater or steepwater-molasses which has had most of its ammonia-precipitable matter removed, one may add a suspending or dispersing agent such as starch paste, dextrin paste, corn syrup or pasted fine slop.

EXAMPLE 11

Concentrated, lactic acid incubated corn steepwater was prepared in accordance with the procedure described under Example 3. This concentrated lactated steepwater, which contains on dry substance basis, about 20 percent of lactic acid 40 percent of proteins, and 14 percent of amino acids, was heated to 165 degrees Fahrenheit and neutralized with lime to 5.2 pH. A heavy precipitate of calcium phytate, together with insoluble calcium salts of proteins, polypeptides and organic acidic materials was obtained. The precipitate was decanted, and the supernatant lime neutralized lactated steepwater solution was cooled to 110 degrees Fahrenheit. There was then added a sufficient amount of diammonium phosphate to transform the dissolved calcium lactate in the lime neutralized lactated steepwater liquor to a liquor consisting of an ammonium lactate solution and a precipitate of dicalcium phosphate.

The dicalcium phosphate, because of its much higher specific gravity, readily settled, and the remaining crude ammonium lactate concentrated steepwater liquor was used as a synthetic protein source for ruminants.

The settled dicalcium phosphate precipitate, after proper washing to remove ammonium salts, was then used as a valuable calcium and phosphorous source in poultry feeding.

EXAMPLE 12

The precipitate of the calcium salts of phytin, proteins, and amino acids, obtained in Example 11 during the lime neutralization of the concentrated lactate steepwater is a valuable poultry feed; and can be blended with other poultry feed ingredients such as ground corn, molasses, or various other grains.

EXAMPLE 13

The diammonium phosphate treated, lime-neutralized lactated steepwater liquor of Example 11, containing the dicalcium phosphate precipitate, was blended with an eighty-five Brix warmed blackstrap molasses in an amount sufficient to result in a liquor blend containing less than 30 percent water. This resulted in a liquid animal feed blend consisting of efficient available synthetic protein in the forms of ammonium lactate and the ammonium salts of the proteins as well as amino acids, plus the nutritionally valuable non-sugar ingredients of molasses, as well as the nutritionally valuable calcium and phosphorous animal feed ingredients.

The presence of molasses enables the dicalcium phosphate to remain in partial suspension. The adding of concentrated commercial blackstrap molasses also makes possible, together with the addition of dry ammonium phosphate, the decrease of the water content of this animal feed composition to a point where it becomes commercially feasible to transport it without excessive water freight costs. The above liquid animal feed blend can be used in all kinds of ruminant animal feeding. A major advantage of such an animal feed product composition is the creation of additional readily available synthetic protein at a cost considerably less than that which would prevail if either urea or natural proteins were used in an equivalent amount.

EXAMPLE 14

Dilute incubated corn steepwater containing about 20 percent lactic acid, and prepared as described in Example 3 was neutralized with lime to 5.1 pH, heated to 180 degrees Fahrenheit and allowed to settle at this higher temperature until the insoluble calcium salts of phytin, protein, and amino acid materials could be decanted. To the hot lime neutralized crude steepwater calcium lactate liquor, there was then added heated blackstrap molasses in an amount equal to one-half of the weight of the hot decanted lime-neutralized steepwater. The resulting blended liquor was then added to an equal weight of a fresh batch of non-incubated dilute corn steepwater. The mixture was then adjusted to a temperature of 125 degrees Fahrenheit and allowed to convert for 48 hours at this temperature. During this time, the lactic acid microorganisms in the fresh, incubated steepwater served as the fermentation starter for the molasses sugars as well as for the sugar in the fresh steepwater.

After 48 hours of fermenting, the resulting lactated sugarized liquor contained 45 percent of lactic acid, on a commercial basis. The speed of the lactic acid conversion can be accelerated by incremental additions of lime during the lactic acid conversion period; using just enough lime neutralizer to maintain a nominal lactic acid acidity sufficient to prevent steepwater putrefaction.

The resulting crude lime-neutralized lactated liquor containing the non-carbohydrate solids of steepwater as well as molasses was then vacuum concentrated to 55 Brix. This resulted in a concentrated thick crude calcium lactate liquor which could be dried or used as a practical liquid base material for subsequent reaction with diammonium phosphate.

EXAMPLE 15

Incubated light corn steepwater was blended with ground corn; and the mixture heated to 180 degrees Fahrenheit to assure gelatinization of the starch in the corn. The resulting mixture of incubated steepwater and gelatinized amylaceous material was then cooled to 140 degrees Fahrenheit and a sufficient amount of amylglucosidase enzyme such as Diazyme, sold by the Miles Chemical Co., was added to enable the major portion of the starch within the corn to be converted to dextrose. This mixture of enzyme-impregnated gelatinized amylaceous material and incubated steepwater was then added to a fresh batch of incubated dilute steepwater in equal proportions. The latter steepwater contained viable lactic microorganisms. The resulting mixture was then allowed to incubate or ferment at 125 degrees Fahrenheit. During this fermentation period the amyloglucosidase produces dextrose from the starch in the gelatinized corn; and simultaneously with this, the lactic acid microorganisms present within the steepwater proceed to convert this newly created dextrose to lactic acid. By this simultaneous enzymatic-microbiological action I am able, in accordance with this invention, to simultaneously produce a highly efficient fermentable sugar such as dextrose, and the fermentation of this dextrose to lactic acid.

After the lactic acid fermentation, the resulting lactated sugarized steepwater mixture or liquor is heated to 180 degrees Fahrenheit and lime-neutralized to 6.0 pH.

The heavy precipitate of calcium phytate plus other insoluble calcium salts is decanted, and the remaining crude calcium lactate liquor is concentrated in a vacuum pan to 55 Brix.

The resulting concentrated crude calcium lactate can then be used as a base or source for ammonium lactate by subsequent blending or reaction with diammonium phosphate; either alone, or in conjunction with any other dry feed materials such as gluten feed, soybean meal, or ground grains, or sugar beet pulp.

EXAMPLE 16

In a wet corn milling plant, the concentrated 55 Brix calcium lactate steepwater liquor prepared in accordance with the above Example 15 can be profitably blended with the stream of material in the feed house which goes into the production of gluten feed. For example, the above crude calcium lactate steepwater concentrate can be added to the corn gluten feed stream in an amount sufficient to develop a corn gluten feed product wherein its dry substance comprises as much as 25 percent of dried crude calcium lactate steepwater dry substance as prepared in the above Example 15.

By dry blending such a corn gluten feed with an amount of dry diammonium phosphate which is only sufficient to react with the calcium lactate in the said resulting gluten feed blend, I obtain a new type of corn gluten feed of enhanced nutritional efficiency containing a base for available synthetic protein created by ammonium lactate. This is because, such a blend of corn gluten feed containing lime-neutralized lactated carbohydrates and diammonium phosphate, results in a product which, when mixed with water, creates a mixture of ammonium lactate solution and a dispersion of insoluble dicalcium phosphate. Such a product is a valuable ruminant animal feed having an enhanced animal nutritional value from the standpoints of increased available protein content as well as alleviating the deficiency of nutritional calcium and phosphorous in corn gluten feed.

In place of ground corn, other dry milling products such as corn hominy feed, corn germ, and various low grade amylaceous grains can be used.

Corn germ is of particular value because it is high in water solubles. The said water solubles can contain lactic acid microorganisms, sugars, as well as valuable lactic acid fermentation nutrient materials such as soluble nitrogen compounds and soluble ash material.

EXAMPLE 17

A farm glazed tile silo was equipped with a perforated bottom located above the silo's bottom at a distance corresponding to about one-fourth of the silo's length. The top part of the silo was filled with hay which had been blended with 25 percent by weight of ground corn. Live steam was then introduced to cause the hay-ground corn mixture to be heated to 180 degrees Fahrenheit; thereby gelatinizing the starch in the corn and destroying fermenting microorganisms.

In a separate container, preferably a concrete tank, a lactic acid fermentation starter was produced by suspending 100 parts by weight of ground corn in 300 parts by weight of water, adding sufficient sulfur dioxide carbon to produce 3.9 pH liquor, and allowing the resulting mixture of dilute $SO_2$ with water and ground corn to steep for 10 hours at 130 degrees Fahrenheit. The resulting mixture of corn steepwater and suspended corn materials contained corn-extracted lactic acid microorganisms capable of acting as a starter for a lactic acid fermentation. A commercial amyloglucosidase enzyme product sold under the trade name of "Diazyme" by the Miles Chemical Company was dispersed into the said mixture of corn steepwater and suspended corn material.

A sufficient amount of the above mixture of Diazyme and corn steepwater suspension was then sprayed into the silo bed of hay and gelatinized ground corn to enable an active lactic acid fermentation and a simultaneous enzymatic conversion of starch to dextrose. The temperature of the resulting mixture in the glass silo was maintained between 125 and 130 degrees Fahrenheit for a period of 48 to 96 hours, depending upon the degree and extent of lactic acid fermentation. During this fermentation period occasional increments of a lime solution was sprayed into the incubated hay batch in order that the lactic acid free acidity be maintained under 0.5 percent.

During the above said fermentation period of 2 to 4 days, the Diazyme was producing free dextrose from the gelatinized starch in the ground corn at the same time that the lactic acid microorganisms were acting to convert dextrose or other sugars to lactic acid.

Since dextrose solution from the gelatinized starch in the ground corn was being created in only incremental steps during the Diazyme conversion, the water being held by the gelatinized ground corn did not liberate until dextrose was formed. This enabled a gradual seeping or feeding of dextrose liquor, and this in turn, made it possible for most of the water in the hay-ground corn batch to remain above the silo's bottom until the starch had been converted to dextrose by the Diazyme and the latter to lactic acid.

In some cases, it may be desirable to prevent any converted liquor from passing through the silo's false bottom until the entire conversion is complete. For this condition, the perforated false bottom is closed by any suitable mechanical means until the conversion is complete. Thereafter the perforations in the false bottom are exposed and the converted liquor from the hay-gelatinized corn mixture consisting of calcium lactate, some free lactic acid, and some free sugars, as well as soluble proteins is allowed to pass through the false bottom perforates to the bottom of the glass silo.

After the lactic acid conversion, the crude lactated sugarized liquor at the bottom of the silo is completely neutralized by the addition of lime until the liquor pH is at 7.2. A sufficient amount of diammonium phosphate is then added to the resulting crude calcium lactate liquor to cause a stoichiometric interchange reaction which results in the production of an equivalent amount of ammonium lactate in solution and a precipitate of dicalcium phosphate. The dicalcium phosphate precipitate settles readily, and can be decanted and sufficiently washed to free it of ammonium lactate contamination; thereby enabling the resulting dicalcium phosphate to be available for use in any kind of animal nutrition feeding, particularly poultry feeding.

The remaining layer of ammonium lactate liquor is high in available synthetic protein content and can be used either directly, or in the form of various blends, as a synthetic protein source in the animal feeding of ruminants.

By adding the batch of ammonium lactate liquor remaining at the bottom of the glass silo to the silo's top batch mixture of hay and fermented ground corn, a valuable ruminant feed mixture is obtained consisting of the synthetic available protein in the ammonium lactate, as well as the nutritionally valuable ruminant calcium feed which is in the form of calcium lactate. Such a blend is of particular value in the feeding of dairy cows.

EXAMPLE 18

The batch of fermented, lime-neutralized, lactated mixture of hay and ground corn prepared in accordance with the previous Example 17 was sprayed with a concentrated solution of diammonium phosphate and agitated to enable thorough contact of the diammonium phosphate with the calcium lactate solution distributed throughout the lactated blend of hay and ground corn.

There resulted a blend of hay, ground corn particles, dicalcium phosphate, ammonium lactate, and the nutritionally valuable synthetic protein ammonium salts of soluble proteins, polypeptides, and non-nitrogenous organic acidic material present in silos, such as acetic or butyric acids.

The above blend can be fed directly to any ruminants or can be blended with other ammoniated ruminant feeds such as ammoniated beet pulp or ammoniated molasses.

EXAMPLE 19

To each 100 parts of hay in a dairy farm silo there was added 35 parts of hot beet molasses which had been heated to 200 degrees Fahrenheit. The hot molasses was preferably added in a manner which enabled it to coat and spread throughout the hay. This silo batch was then allowed to cool to 130 degrees Fahrenheit and a batch of corn steepwater lactic acid fermentation starter of the same kind as that described in the previous Example 17 was sprayed into the hay-molasses mixture. The resulting batch was then allowed to ferment for 72 hours at 125 degrees Fahrenheit. During this fermentation period increments of a dilute lime solution were sprayed into the batch to maintain the free lactic acid below 0.5 percent.

At the beginning of the lactic acid conversion, the high viscosity of the molasses liquor prevented the flow of any in situ created lactic acid to the bottom of the batch. As the lactic acid fermentation proceeded, the viscosity of the molasses radically decreased, and the resulting calcium lactate liquor took on a flowing form and therefore flowed to the bottom of the silo.

After the completion of the fermentation, the resulting top blend layer of lime-neutralized lactated molasses was mixed with a sufficient amount of a concentrated diammonium phosphate solution to complete a stoichiometric reaction between the diammonium phosphate and the calcium lactate as well as the calcium salts of other acidic material originating either from the hay or from non-sugar molasses solids. Because of the disappearance of the molasses sugars and their transformation into ammonium lactate, most of the molasses viscosity as well as stickiness is destroyed, and there results a non-viscous, non-sticky blend of hay, molasses solids, ammonium lactate and dicalcium phosphate. This was used as a feed supplement for dairy cattle.

EXAMPLE 20

Two-thirds of a glass farm silo was filled with a mixture consisting of ground corn and 35 percent by weight of blackstrap cane molasses which had been dissolved in an amount of hot water corresponding to one-half of the weight of ground corn in the said farm silo. Before adding the resulting blackstrap water solution to the ground corn, the molasses liquor was cooled to 140 degrees Fahrenheit. To this molasses liquor there was added an amount of sulfur dioxide sufficient to produce a liquor having a pH of 3.9. This $SO_2$-molasses steep liquor was then mixed with the said ground corn and the resulting batch allowed to steep and ferment in the glass silo at a temperature of 130 degrees Fahrenheit for 96 hours. During this time, the lactic acid microorganism present in the ground corn dissolved into the $SO_2$ acidified molasses liquor and subsequently proceeded to fermentatively convert the free sugars in the molasses to lactic acid. During this fermenting period, small increments of a lime solution were added to maintain the free lactic acid acidity at between 0.5 and 1.0 percent.

After the completion of the lactic acid conversion sufficient lime was added to neutralize all free acidity, and the resulting formation of calcium lactate in the ground corn-lime neutralized lactated molasses blend was dried in a rotary Louisville type dryer to a blended moisture content of 14 percent. This resulted in a non-hygroscopic, non-sticky blend of lime-neutralized lactated molasses with ground corn. The elimination of the free sugars in the molasses by means of the lactic acid fermentation, and the formation of calcium lactate as well as other calcium salts of the acidic non-sugar materials in the molasses enable the production of a non-hygroscopic dry blend of ground corn with a large proportion of molasses solids. This type of non-hygroscopic blend of lactated molasses and ground grain is a valuable animal feed by itself when fed to ruminants, hogs, or poultry.

In addition to this, the above type of blend of lime-neutralized lactated molasses with ground grain becomes a valuable means for creating additional available synthetic protein, when dry blended with diammonium phosphate.

For example, the above type of dry mixture of lime-neutralized lactated molasses and ground grain was dry blended with a sufficient amount of diammonium phosphate to cause the liberation of ammonium lactate and dicalcium phosphate upon admixture with water.

Such a dry blend is a valuable ruminant feed, particularly for dairy cattle. If desired, one may incorporate such a blend of grain, lime-neutralized molasses, and diammonium phosphate; into a pelletized edible feed product. This results in making available valuable, efficiently available, nutritional synthetic protein from the ammonium lactate which results when this type of blend is brought into contact with water by either the actual addition of water or by the digestive moisture of the ruminant animal when the latter is fed a pelletized ruminant feed mixture containing diammonium phosphate and calcium lactate.

EXAMPLE 21

A mixture of shelled corn, molasses and feed grade ground calcium carbonate was added to an underground silo having a depth of 10 feet, a length of 80 feet and a width of 40 feet. Before blending with the shelled corn, the molasses was heated to a flowable viscosity and blended with ground calcium carbonate. The mixture of heated molasses and calcium carbonate was then poured over the shelled corn in the underground silo. Jets of live steam were then allowed to impinge upon the corn kernels coated with molasses and sufficient heat was applied via this steam to sterilize the mass. A sufficient amount of supplemental water was then added to result in a composition having a constituent ratio of 100 parts of shelled corn, 50 parts of commercial molasses and 20 parts of ground calcium carbonate. The resulting mixture in the underground silo was allowed to cool to 100 degree Fahrenheit. There was then added, by means of spraying, 10 gallons of silage juice obtained from a separate farm silo where green forage had been stored and allowed to stand until an active fermentation had resulted in the creation of a silage juice containing 1.5 percent of acidity, measured as lactic acid. This silage juice consisted of lactic acid, minor amounts of other fermentable acids such as acetic or butyric acids, and a large amount of viable microorganisms capable of fermenting crude carbohydrates to lactic acid.

The underground silo was equipped with walls of thin wooden panels having a thin coat of lactic acid resistant plastic material. The silo was provided with the necessary means for spraying steam and for atomizing silage juice containing the lactic acid microorganism. The underground silo, after the above said proper preparation of the mixture of shelled corn, molasses. calcium carbonate, and silage juice, was properly covered to prevent outside contamination. Suitable means were then provided to allow the mixture to undergo a lactic acid fermentation at 100 degrees Fahrenheit for a period of one week.

There resulted an underground silo mixture of gelatinized shelled corn, and a liquor containing calcium lactate, non-carbohydrate molasses solids, and soluble calcium salts of proteins, polypeptides, amino acids, phytates as well as the soluble calcium salts of other complex organic acidic materials present in the said mixture.

The above lime-neutralized lactate crude carbohydrate animal feed mixture was then used as a feeding source for ruminants or poultry.

On dairy farms, the above underground lime-neutralized carbohydrates feed composition is of particular value as a source for ammonium lactate and dicalcium phosphate for ruminants. This is obtained by adding a sufficient amount of diammonium phosphate to the lime-neutralized lactate underground silo feed mixture to react with the calcium lactate and produce ammonium lactate liquor in parallel with precipitated dicalcium phosphate.

When it is desired to feed the dairy cattle with a sweetening agent as well as the above ammonium lactate and dicalcium phosphate, the fermentation of the molasses in the above said underground silo mixture by the silage juice microorganisms is allowed to extend only to a point where between 75 and 85 percent of the molasses sugars have been changed to edible acidic material. The remaining 25 to 15 percent of free sugars result in a sweetened animal feed containing ammonium lactate and dicalcium phosphate.

With the above process, a dairy farm creates a source of additional synthetic protein of high biological availability simultaneously with a cheap source of calcium and phosphorous.

Where the use of pelletized animal feed products is desirable, my mixture of lime-neutralized lactated sugarized crude carbohydrates of corn and molasses can be blended with animal feed pellets containing the necessary additional vitamin and other nutritional ingredients. The resulting blend can be fed directly to poultry. For ruminants, particularly for dairy cows, the resulting blend of animal feed pellets and lime-neutralized lactated carbohydrate feed mixtures is reacted with dicalcium phosphate.

Since diammonium phosphate reacts readily with a calcium lactate solution, and since both of these compounds are readily soluble in warm water, ruminants can beneficially utilize the diammonium phosphate reaction with calcium lactate within the ruminant's digestive system. For example, by providing a pelletized feed product containing, in addition to the usual feed ingredients in the feed pellets, of a dry blend mixture of crude calcium lactate and diammonium phosphate, a pellet is obtained, which, when digested by the ruminant, results in the rapid interaction of the diammonium phosphate with the calcium lactate, because of the readily solubility of these two ingredients in the warm solubilizing liquids present in the ruminant's digestive system. For such pellets it is preferable to control the proportion of diammonium phosphate so that the amount present is not greater than the stoichiometric amount which will react with the calcium lactate being digested by the ruminant.

In the above example, instead of shelled corn, any kind of silage, as well as ground grain, sugar pulp, or ground roughage such as comminuted corn cobs, sugar cane bagasse, or various fractions of the said roughage material could be used. The exploitation of the diammonium phosphate reaction makes it possible to enhance the value of these roughage materials because of the enhancement of the amount of protein nitrogen by means of the efficient ammonium lactate synthetic protein source.

Valuable animal feed products of enhanced high quality protein values can also be obtained by eliminating grains and just using mixtures of comminuted corn cob or sugar cane bagasse blended with any kind of molasses by-product and subsequently subjected to a low cost lactic acid fermentation, lime neutralization, and reaction with diammonium phosphate.

The pre-treatment of the mixture of shelled corn and molasses with live steam results in the sterilization of the batch. This minimizes the dangers of non-lactic acid microorganism side fermentations. After the completion of the fermentation and the lime neutralization of the acidic materials the finished batch may be further sterilized with another steam injection or, for prolonged preservation against spoilage, an edible animal feed preservative such as 0.1 percent of benzoate soda is incorporated.

EXAMPLE 22

To a steam sterilized sugar cane juice extracted from sugar cane in a raw sugar production plant, there were added invertase enzyme, lactic acid microorganisms together with the necessary nutrients, and sufficient ground limestone to maintain the pH of the lactic acid fermentation mixture at 5.8. The batch was allowed to ferment at 120 degrees Fahrenheit for 7 days. At this point, 95 percent of the sugars had been converted to lactic acid and simultaneously neutralized to calcium lactate.

To assure maximum non-hygroscopicity of the subsequently dried batch, a sufficient amount of crude glucose oxidase enzyme was added to convert the remaining dextrose in the inverted cane juice to gluconic acid. The fermentation of the batch was continued for 8 hours, whereupon the remaining dextrose was converted to calcium gluconate.

The batch was then filtered and vacuum concentrated to a 40 Brix liquor consisting of dissolved calcium lactate and non-sugar invert molasses solids.

Since the invert molasses had, by means of the combined lactic and gluconic acid fermentation, been converted to a material free of sugars, the material could be dehydrated to a moisture content of less than 10 percent without inviting viscosity or stickiness problems inherent with molasses, and without introducing the hygroscopicity factor inherent in regular dehydrated molasses products. Because of these advantages, the further dehydration of the 40 Brix material, either alone, or in conjunction with other feed material, becomes a much easier process operation.

Thus, comminuted sugar can bagasse, a waste material at a cane sugar plant, can be incorporated in the above concentrated crude calcium lactate molasses liquor; and the subsequently dried blend will be a comparatively free flowing, non-hygroscopic animal feed mixture.

The glucose oxidase enzyme does not have to be of high purity, and preferably is crude glucose oxidase culture liquor before the enzyme's isolation by precipitation. This makes it possible to use a low cost glucose oxidase that is relevant to feed industry economics.

In place of cane juice mixed with invertase, any sugar liquor substrate comprising sugar mixtures including dextrose may be used. Examples are sugar cane juice, various commercial molasses products, and dilute cane refinery or beet sugar refinery molasses liquors before going to the molasses vacuum pan concentration step.

Because of the higher fermentation costs with glucose oxidase, as compared to lactic acid fermentations, it is preferable to use the glucose oxidase only for the elimination of dextrose remaining after the lactic acid fermentation. However, one may, if one desires, introduce the enzymatic glucose oxidase gluconic acid fermentation at any point of the lactating fermentation process. This is because, it has been found that the glucose oxidase fermentation can go on simultaneously with the lactic acid fermentation.

In carbohydrate feed liquors containing maltose as well as dextrose, the presence of residual maltose from a lactic acid fermentation can be eliminated by adding a small amount of amyloglucosidase to the lactic acid fermentation batch. This results in the transformation of the maltose to dextrose, thereby making it possible to eliminate residual dextrose by means of glucose oxidase. Such combined fermentation and enzymatic procedures are of particular value when the carbohydrate feed starting material is amylaceous material containing maltose resulting from either in situ diastatic action or from the addition of various malt diastase products.

EXAMPLE 23

Dehydrated, lime-neutralized lactated liquors comprising mixtures of calcium lactate and calcium gluconate as described in Example 22, were blended with a sufficient amount of diammonium phosphate to, upon the addition of water, transform calcium lactate to ammonium lactate, and calcium gluconate to ammonium gluconate. This produces a dry blend of particular value for use in conjunction with dry comminuted sugar cane bagasse residues or various ground corn cob products. The particular value of the presence of a combination of dry calcium lactate and diammonium phosphate resides in the fact that ammonium lactate has specific advantages as an agent which is conducive towards the more efficient digestion of cellulosic or pentosan material by a ruminant's digestive system. Since cane bagasse and corn cobs are high in such cellulosic and pentosan material, the ammonium lactate acts as a valuable tool to make these hitherto low value animal feed materials become products which can be more efficiently utilized by the ruminant.

EXAMPLE 24

Dry, lime-neutralized lactated cane molasses prepared by the process described in Example 10 was blended with an equal weight of feed grade lard fat. The resulting blend was then added to a dry poultry feed in an amount sufficient to introduce a fat content of five percent in the formulated feed.

For ruminants, the above 50–50 blend of feed fat and limed lactated molasses was further blended with a sufficient amount of dry diammonium phosphate to transform the calcium lactate to ammonium lactate. This results in a feed formulation which, when eaten by the ruminant, enables the ruminant digestive liquors to form ammonium lactate, which is a valuable synthetic protein of high biologic availability.

By means of the above type of blends of dry, non-hygroscopic lactated molasses and fat, it becomes possible to conveniently include molasses solids, feed fat, lime, phosphate, and synthetic protein into feed formulations for ruminants. For poultry, the diammonium phosphate should be present in much smaller proportion, or eliminated.

In place of molasses, any feed-grade carbohydrate liquor could be used in the above examples, provided the non-carbohydrate constituents were non-hygroscopic in a dehydrated state.

While I have illustrated and described a precise arrangement for carrying the invention into effective use, this is capable of many variations, modifications and alterations without departing from the spirit of the invention. I therefore do not wish to be limited by the description forming a part of this specification, but desire to avail myself of such changes or combinations as may fall within the spirit and scope of the appended claims.

What I claim as new and desire to secure by Letters Patent of the United States is as follows:

1. The process for producing a non-hygroscopic, dry, high molasses content feed product which comprises: diluting a commercial molasses with water to a lactic acid fermentable sugar concentration, adding lactic acid producing microorganisms, fermenting under suitable lactic acid producing conditions until over ninety-five percent (95%) of the sugars in the said molasses diluent are converted to lactic acid, neutralizing the resulting lactic acid-molasses liquor with lime, dehydrating the lime-treated mixture, and blending with the said dehydrated mixture, a dry, comminuted animal feed product; said feed product content amounting to not more than twenty-five percent (25%) of the finished blended feed composition.

2. The product produced by the process of claim 1.

3. The method of producing a non-hygroscopic animal feed product from hygroscopic molasses which comprises fermenting water-diluted commercial molasses under suitable lactic acid producing conditions, including the presence of lactic acid-producing microorganisms, until over ninety-five percent (95%) of the sugars present have been converted to lactic acid; neutralizing the resulting lactic acid molasses liquor with lime; and dehydrating the lime-treated liquor.

4. The product of claim 3.

5. The method for the simultaneous production of both an ammonium lactate ruminant feed and a dicalcium phosphate non-ruminant feed, which comprises the steps of
 (i) lactating a carbohydrate liquor;
 (ii) lime-neutralizing the resulting aqueous lactated liquor;
 (iii) adding diammonium phosphate to the crude calcium lactate liquor in an amount sufficient to transform calcium lactate to ammonium lactate; and
 (iv) separating the precipitated dicalcium phosphate from the ammonium lactate solution.

6. The method of producing a ruminant feed blend possessing a simultaneous digestive source for ammonium lactate, ammonium gluconate, and dicalcium phosphate, which comprises the steps of:
 (i) lactating a carbohydrate feed liquor containing free di- and mono-saccharides;
 (ii) lime-neutralizing the resulting aqueous lactated feed product;
 (iii) subjecting any residual dextrose remaining after said lactating to a glucose oxidase fermentation to convert residual dextrose to gluconic acid;
 (iv) lime-neutralizing the gluconic acid;
 (v) dehydrating the resulting mixture of calcium lactate, calcium gluconate, and desugarized feed liquor solids to a state suitable for dry blending; and
 (vi) blending therewith a sufficient amount of diammonium phosphate to react with the calcium lactate and calcium gluconate.

7. The method of enhancing the ruminant nutritional properties of an edible aqueous animal feed liquor containing fermentable carbohydrates, by means of the simultaneous creation of ammonium lactate and dicalcium phosphate, which comprises:
 (1) subjecting said liquor to the fermentation action of microorganisms adapted to convert carbohydrates to lactic acid until over fifty percent (50%) of said carbohydrates have been so converted;
 (2) lime-neutralizing the lactated carbohydrate product of step (1);
 (3) reacting the lime-neutralized liquor of step (2) with diammonium phosphate.

8. The process of claim 7 wherein the aqueous animal feed liquor is a mixture of molasses and corn steepwater.

References Cited

UNITED STATES PATENTS

| | | | |
|---|---|---|---|
| 2,032,443 | 3/1936 | Schultz et al. | 195—48 X |
| 2,232,554 | 2/1941 | Muller | 195—48 X |
| 2,313,275 | 3/1943 | Schopmeyer | 99—9 |
| 2,452,534 | 11/1948 | Jeffreys | 99—9 |
| 2,603,567 | 7/1952 | Stiles. | |
| 2,712,516 | 7/1955 | Kooi et al. | 195—48 |
| 2,904,437 | 9/1959 | Czarnetzky | 99—9 |
| 2,760,866 | 8/1956 | Nielsen | 99—2 |
| 3,248,224 | 4/1966 | Loomis et al. | 99—2 |
| 2,755,187 | 7/1956 | Belasco | 99—2 |

FOREIGN PATENTS 57,848  1/1946  Netherlands.

OTHER REFERENCES

Prescott et al.: Industrial Microbiology, 3rd ed., 1959, pp. 306–316.

LIONEL M. SHAPIRO, Primary Examiner

U.S. Cl. X.R.
99—2, 6; 195—48